(12) United States Patent
Grgic et al.

(10) Patent No.: US 7,778,714 B2
(45) Date of Patent: Aug. 17, 2010

(54) ON-LINE EDITING ASSOCIATED WITH CONTROLLER ENGINE INSTANCES

(75) Inventors: Richard J. Grgic, Painsville, OH (US); Subbian Govindaraj, Solon, OH (US); Kenwood Henry Hall, Hudson, OH (US); Robert J. Kretschmann, Bay Village, OH (US); Charles Martin Rischar, Chardon, OH (US); Raymond John Staron, Chagrin Falls, OH (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 384 days.

(21) Appl. No.: 11/686,406

(22) Filed: Mar. 15, 2007

(65) Prior Publication Data

US 2008/0208375 A1 Aug. 28, 2008

Related U.S. Application Data

(63) Continuation-in-part of application No. 11/679,380, filed on Feb. 27, 2007, and a continuation-in-part of application No. 11/679,394, filed on Feb. 27, 2007, now Pat. No. 7,684,876.

(51) Int. Cl.
*G05B 11/01* (2006.01)
(52) U.S. Cl. .......................................... 700/19
(58) Field of Classification Search ................ 700/19, 700/20, 31; 717/136, 151, 168; 718/105
See application file for complete search history.

(56) References Cited

U.S. PATENT DOCUMENTS

| 5,142,469 A | 8/1992 | Weisenborn |
| 5,796,603 A | 8/1998 | Hodorowski |
| 5,826,244 A | 10/1998 | Huberman |
| 5,875,461 A | 2/1999 | Lindholm |
| 5,887,029 A | 3/1999 | Husted et al. |
| 5,949,674 A | 9/1999 | Song et al. |
| 5,970,243 A * | 10/1999 | Klein et al. .............. 717/113 |
| 5,971,581 A | 10/1999 | Gretta et al. |
| 6,055,370 A | 4/2000 | Brown et al. |
| 6,268,853 B1 | 7/2001 | Hoskings et al. |
| 6,338,130 B1 | 1/2002 | Sinibaldi |

(Continued)

OTHER PUBLICATIONS

Foley, M. "Modify MicroLogix online"; Feb. 2006; A-B journal, vol. 13, No. 1 ;abstract; pp. 1-2.*

(Continued)

*Primary Examiner*—Albert DeCady
*Assistant Examiner*—Chad Rapp
(74) *Attorney, Agent, or Firm*—Turocy & Watson LLP; R. Scott Speroff; John M. Miller

(57) ABSTRACT

The claimed subject matter provides a system and/or method that facilitates programming in an industrial environment. An online controller can execute with a real-time operating system such that the online controller can include two or more controller engine instances executing as processes on the online controller, wherein at least one controller engine instance can employ a portion of code to utilize a device within the industrial environment. An edit component can dynamically implement a portion of disparate code with at least one controller engine instance.

25 Claims, 12 Drawing Sheets

U.S. PATENT DOCUMENTS

| | | | |
|---|---|---|---|
| 6,373,836 B1 | 4/2002 | Deryugin et al. | |
| 6,453,460 B1 | 9/2002 | Keyes | |
| 6,615,092 B2 | 9/2003 | Bickley et al. | |
| 6,735,764 B2 * | 5/2004 | Nakai | 717/156 |
| 6,816,746 B2 | 11/2004 | Bickley et al. | |
| 6,882,890 B2 | 4/2005 | Horn et al. | |
| 6,901,446 B2 | 5/2005 | Chellis et al. | |
| 6,922,681 B2 | 7/2005 | Fromherz et al. | |
| 6,947,798 B2 | 9/2005 | Bronikowski et al. | |
| 7,039,740 B2 | 5/2006 | Glasco et al. | |
| 7,065,714 B1 | 6/2006 | Theel et al. | |
| 7,139,618 B2 | 11/2006 | Danz et al. | |
| 7,257,620 B2 * | 8/2007 | Lo | 709/217 |
| 7,272,815 B1 * | 9/2007 | Eldridge et al. | 717/101 |
| 7,374,524 B2 | 5/2008 | McCormick | |
| 7,472,387 B2 * | 12/2008 | Nakano | 717/174 |
| 2002/0129085 A1 | 9/2002 | Kubala et al. | |
| 2002/0194417 A1 * | 12/2002 | Suzuki et al. | 710/305 |
| 2003/0163508 A1 | 8/2003 | Goodman | |
| 2004/0117535 A1 | 6/2004 | Schaftlein | |
| 2005/0024102 A1 | 2/2005 | Kondo | |
| 2005/0028137 A1 * | 2/2005 | Evans et al. | 717/110 |
| 2005/0202808 A1 | 9/2005 | Fishman et al. | |
| 2006/0005171 A1 * | 1/2006 | Ellison | 717/131 |
| 2006/0041328 A1 * | 2/2006 | McCormick | 700/179 |
| 2006/0092861 A1 | 5/2006 | Corday et al. | |
| 2006/0150174 A1 | 7/2006 | Abe et al. | |
| 2006/0178757 A1 | 8/2006 | Grgic et al. | |
| 2007/0044066 A1 | 2/2007 | Meijer et al. | |
| 2007/0173959 A1 | 7/2007 | Chandhoke | |
| 2008/0066019 A1 * | 3/2008 | Worek et al. | 715/965 |
| 2008/0090586 A1 | 4/2008 | Engelhart | |
| 2008/0109471 A1 | 5/2008 | Subbian et al. | |
| 2008/0125877 A1 | 5/2008 | Miller et al. | |

OTHER PUBLICATIONS

OA mailed Mar. 20, 2009 for U.S. Appl. No. 11/679,380, 41 pages.
OA mailed Mar. 9, 2009 for U.S. Appl. No. 11/695,758, 33 pages.
OA mailed Mar. 19, 2009 for U.S. Appl. No. 11/733,357, 34 pages.
OA mailed Mar. 20, 2009 for U.S. Appl. No. 11/679,394, 37 pages.
OA dated Apr. 1, 2009 for U.S. Appl. No. 11/738,787, 32 pages.
OA dated Mar. 20, 2009 for U.S. Appl. No. 11/733,390, 35 pages.
OA dated Oct. 7, 2009 for U.S. Appl. No. 11/679,380, 38 pages.
OA dated Oct. 19, 2009 for U.S. Appl. No. 11/695,758, 32 pages.
OA dated Aug. 18, 2009 for U.S. Appl. No. 11/738,784, 38 pages.
OA dated Oct. 2, 2009 for U.S. Appl. No. 11/738,787, 22 pages.
OA dated Oct. 19, 2009 for U.S. Appl. No. 11/733,357, 38 pages.
OA dated Oct. 16, 2009 for U.S. Appl. No. 11/733,390, 41 pages.
Johnson, et al. "OS Partitioning for Embedded Systems" Feb. 2, 2006; QNX Software Systems, pp. 1-9.
Johnson. Lowering the Development Costs of Industrial Control Systems through Software Partitioning. Aug. 15, 2006; QNX Software Systems, pp. 1-9.
OA dated Feb. 22, 2010 for U.S. Appl. No. 11/738,787, 35 pages.
OA dated Feb. 23, 2010 for U.S. Appl. No. 11/738,784, 35 pages.
OA dated Apr. 14, 2010 for U.S. Appl. No. 11/733,390, 67 pages.
Final Office Action dated Jun. 3, 2010 for U.S. Appl. No. 11/695,758; pages 54.
Office Action dated May 24, 2010 for U.S. Appl. No. 11/695,727; pages 37.

* cited by examiner

ON-LINE EDITING ASSOCIATED WITH CONTROLLER ENGINE INSTANCES

CROSS REFERENCE TO RELATED APPLICATION(S)

This continuation-in-part application claims the benefit of U.S. patent application Ser. No. 11/679,380 filed on Feb. 27, 2007, entitled "CONSTRUCTION OF AN INDUSTRIAL CONTROL SYSTEM USING MULTIPLE INSTANCES OF INDUSTRIAL CONTROL ENGINES" and U.S. patent application Ser. No. 11/679,394 filed on Feb. 27, 2007, entitled "DYNAMIC LOAD BALANCING USING VIRTUAL CONTROLLER INSTANCES." The entireties of such applications are incorporated herein by reference.

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine. Moreover, in relation to industrial automation environments, controllers and control engines have a one-to-one ratio, wherein one control engine is executed per physical hardware platform (e.g., controller). With such one-to-one ratio, optimizing controllers to utilize full potential in a dynamic manner is virtually impossible. Moreover, in order to increase the efficiency in light of the constraints associated with conventional techniques described above, an increase in the amount of controllers is required which can be costly, inefficient, counter-productive, and meticulous. Furthermore, updating, manipulating, trouble-shooting, or testing code related to controllers can be a crucial and important task with little or no room for error such that downtime should be minimized for safety and/or productivity.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate employing offline and/or online programming of at least one controller engine instance within an industrial environment. An edit component can enable dynamic and seamless code implementation to at least one controller engine instance executing on a controller within an industrial environment. The edit component can exchange and/or swap a portion of code onto the controller engine instance in real time and on-the-fly so as to not disturb and/or affect any other controller engine instances and/or controllers within the industrial environment. In particular, a portion of code can be written with the controller engine instance online, offline, and/or any combination thereof. Thus, a portion of code can be written and implemented to a selected controller engine instance utilizing the edit component such that the code implementation is in real time and isolated to such controller engine instance.

Moreover, the edit component can provide enhanced trouble-shooting and/or testing for code within an industrial environment. For instance, a portion of code can be written online, offline, etc., wherein the portion of code can be installed in an isolated manner to a selection of controller engine instances. Upon a specified time period, the portion of code can be uninstalled and evaluated to determine the extent of effectiveness for the industrial environment. Based on such isolated testing technique, the edit component can vastly improve efficiency of controllers, controller engine instances, and/or the industrial environment. In other aspects of the claimed subject matter, methods are provided that facilitates programming a controller engine instance in real-time within an industrial automation environment.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
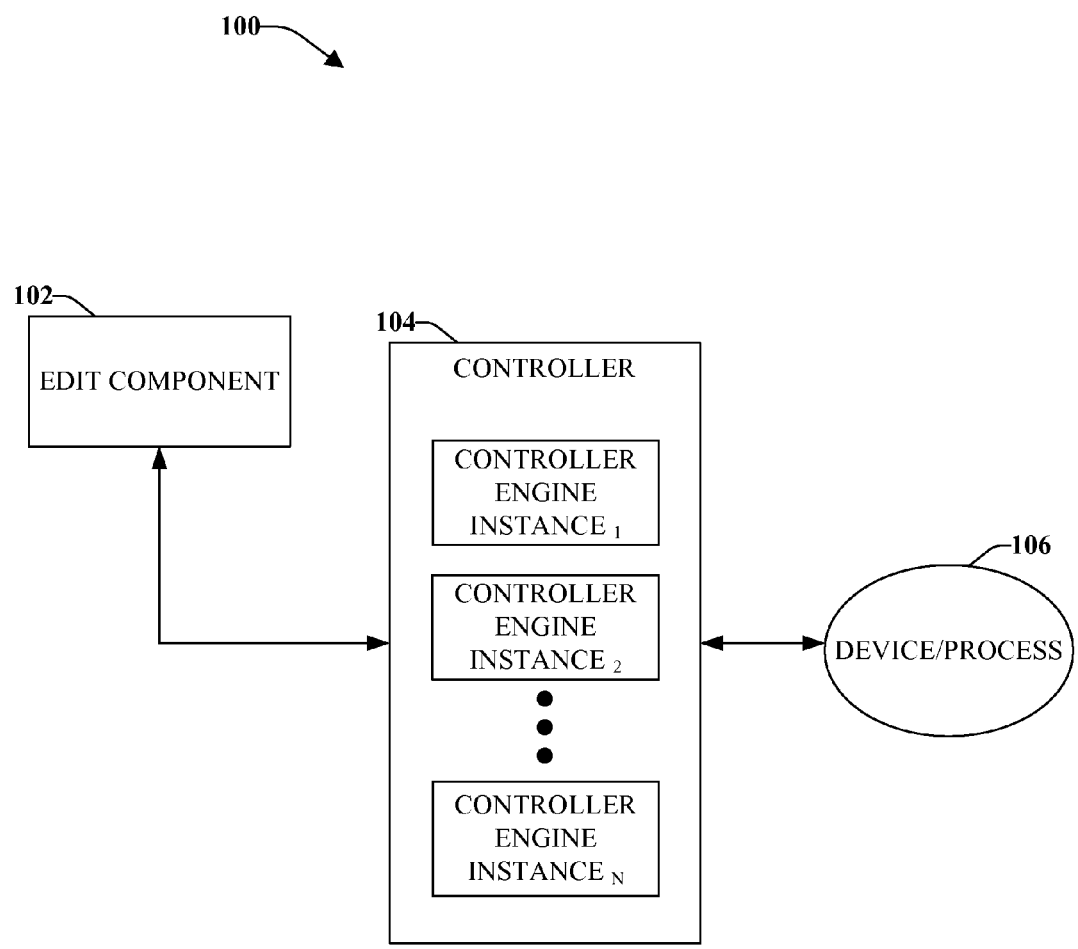
FIG. 1 illustrates a block diagram of an exemplary system that facilitates employing offline and/or online programming of at least one controller engine instance within an industrial environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates employing offline and/or online programming of at least one controller engine instance within an industrial environment. The system 100 can include an edit component 102 that can provide programmatic access to at least one controller engine instance hosted by a controller 104 with a real time operating system. In general, the edit component 102 can install and/or uninstall a portion of code related to a controller engine instance in an isolated manner such that the target controller engine instance (e.g., location of a code install, uninstall, update, etc.) is not disturbed from a state of operation. By utilizing the edit component 102 to dynamically update and/or implement disparate portions of code (e.g., disparate in comparison to code existent within the system) to a controller engine instance or a plurality of controller engine instances seamlessly to optimize control of a device and/or process 106. It is to be appreciated that the edit component 102 can enable most any suitable change and/or manipulation with a portion of code regardless of the amount of data which can include code addition, code deletion, code content update, code functionality change, etc.

For example, an industrial environment can include two or more controller engine instances (e.g., controller engine instance A and controller engine instance B, etc.) executing on a controller with a real time operating system, wherein each controller engine instance can include respective code and/or versions of code (e.g., controller engine instance A utilizing code version 1, controller engine instance B utilizing code version 2, etc.). The edit component 102 can enable a portion of code (e.g., written with a portion of the controller and/or controller engine instance offline, written with a portion of the controller and/or controller engine instance online, and/or most any suitable combination thereof) to be employed with at least one controller engine instance. In other words, the edit component 102 can allow a seamless hand-off or swapping from a first version of code with another version of code in which both are associated with a particular controller engine instance. Therefore, on-the-fly dynamic code changes (e.g., upgrades, installs, uninstalls, re-installs, minor updates, minor manipulations associated with a portion of code, etc.) can be employed with a portion of the controller and/or controller engine instance online, offline, and/or most any suitable combination thereof. Moreover, such install, uninstall, re-install, update, etc. of a portion of code can be isolated to a target and/or host (e.g., a host controller, a controller engine instance, a portion of controller engine instances, etc.). As a result, a portion of code related to controllers and/or controller engine instances can be selectively edited (e.g., upgraded, deleted, re-installed, uninstalled, etc.). Such abilities enable enhanced trouble-shooting and/or optimizing of an industrial automation environment based on such selective and/or partial changing of code.

For instance, a portion of code can be written offline and uploaded to at least one online controller engine instance associated with the controller 104 in an industrial automation environment. In one example, the controller can include multiple controller instances that initiate a particular version of code. A portion of code (e.g., an updated version of code) can be written offline and subsequently handed-off to a specific selection of online controller instances—thereby allowing a selection of controller instances running one version of code and another selection of controller instances running a disparate version of code at the same time. In a specific example, a portion of code can be installed (e.g., at the start of a shift) and uninstalled (e.g., at the end of a shift) on-the-fly to allow the minimization of downtime of a controller and/or respective controller instances.

In addition, the offline and/or online programming can be employed for trouble-shooting code within an industrial automation environment. In one example, a portion of test code can be written offline and then deployed to at least a portion of the controller instances. Upon deployment, data can be collected and analyzed in order to provide improvements, updates, etc. to the test code, wherein the data collected can relate to the deployment and/or effects of the test code with the controller instance(s). Once improved, the test code can be redeployed to the system minimizing any possible errors with such code.

It is to be appreciated that the controller 104 can contain software components and hardware components having inputs and/or outputs that can be utilized in connection with automating an industrial manufacturing device/process. Moreover, it is to be appreciated and understood that the controller 104 can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the soft PLC can be partitioned to employ most any suitable soft PLC engine instances on a real time operating system (e.g., rather than a soft PLC controller executing on an operating system as non-real time), wherein each soft PLC engine instance can handle a portion of what the soft PLC engine handled, controlled, etc.

It is to be noted that the controller 104 can include various computer or network components such as servers, clients, communications modules, mobile computers, wireless components, control components and so forth that are capable of interacting across a network (not shown). Similarly, the term PLC or controller as used herein can include functionality that can be shared across multiple components, systems, and or networks. For example, one or more controllers 104 (e.g., PLCs, etc.) can communicate and cooperate with various network devices across a network. This can include substantially any type of control, communications module, computer, I/O device, sensor, Human Machine Interface (HMI)) that communicate via a network which includes control, automation, and/or public networks. The controller 104 can also communicate to and control various other devices such as Input/Output modules including Analog, Digital, Programmed/Intelligent I/O modules, other programmable controllers, communications modules, sensors, output devices, and the like.

A network can include public networks such as the Internet, Intranets, and automation networks such as Common Industrial Protocol (CIP) networks including DeviceNet, ControlNet, and Ethernet/IP. Other networks include Ethernet, DH/DH+, Remote I/O, Fieldbus, Modbus, Profibus, wireless networks, serial protocols, and so forth. In addition, the network devices can include various possibilities (e.g., hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In another aspect in accordance with the subject innovation, the controller 104 can be implemented in the industrial automation environment (e.g., an industrial environment, an automation environment, an environment, an automation industry, etc.) which employs a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy (discussed in further detail in FIG. 10). It is to be appreciated that the controller software can be distributed as a component of a disparate application (e.g., a larger application). For instance, a controller component can be included on a welder (e.g., a robot welder, an automated welder, etc.), wherein the controller can execute within the context of the welder (e.g., executing within the context of the robot welder).

Figure 2:
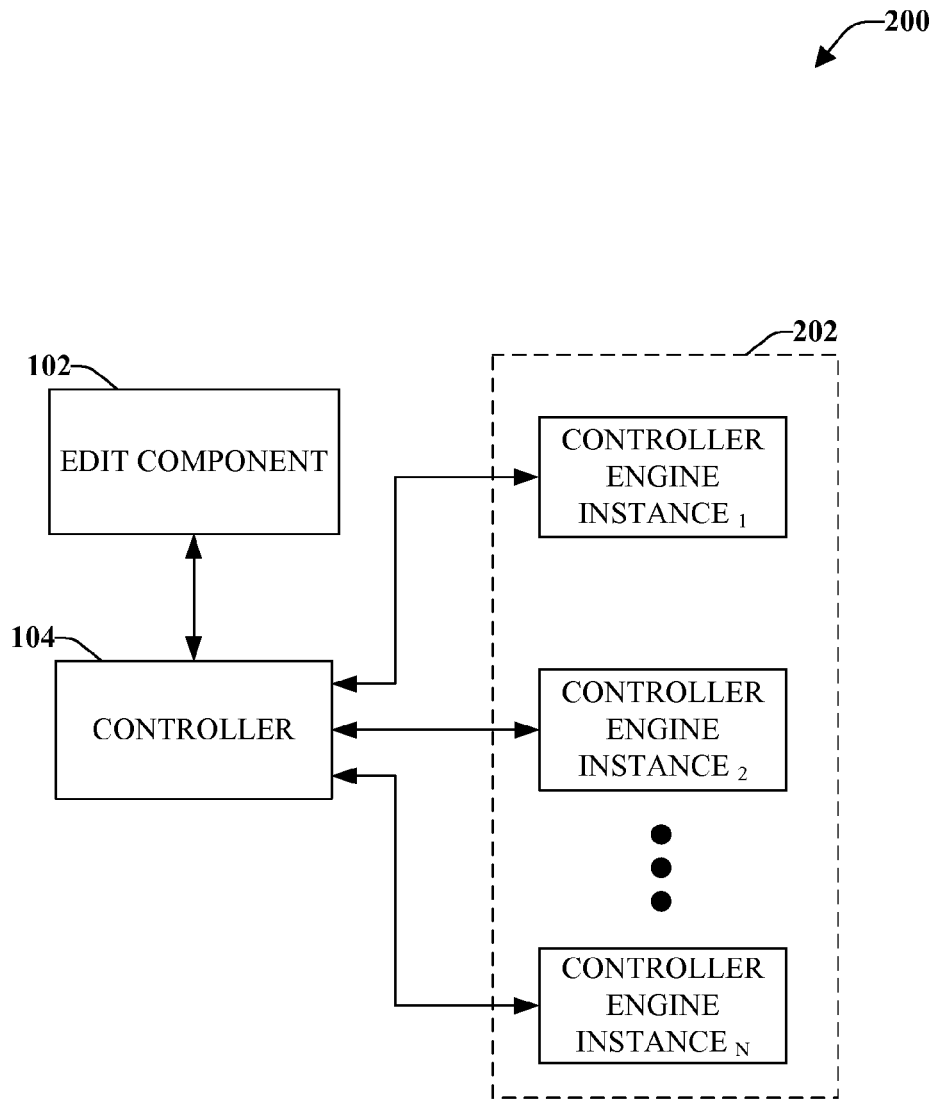
FIG. 2 illustrates a block diagram of an exemplary system that facilitates employing one or more controller engine instances related to a controller.

FIG. 2 illustrates a system 200 that facilitates employing one or more controller engine instances related to a controller. The system 200 can include the controller 104 that can generate at least one controller engine instance 202, wherein the controller engine instance 202 can execute on the controller 104 with a real time operating system (OS) to be utilized with automating/controlling an industrial manufacturing device and/or process. It is to be appreciated most any suitable operating system can be utilized by the subject innovation (e.g., a proprietary operating system, off-the-shelf, a third-party operating system, an open source operating system, a real time operating system (OS), etc.). The controller 104 can utilize most any suitable number of controller engine instances 202 such as controller engine instance 1, controller engine instance 2 to controller engine instance N, where N is a positive integer. In other words, the controller 104 can implement a plurality of controller engine instances 202, wherein each controller engine instance can handle controlling a device and/or portion of a process within an industrial automation environment. It is to be appreciated that the system 200 can enable the creation of a new instance of an engine based on a set of pre-defined parameters. In other words, no user intervention is needed to start a new instance of the engine.

For example, an industrial automation environment can include a controller that can be utilized with a first process, a second process, and a device. Conventionally, a controller and a controller engine are restricted to a one-to-one ratio such that there is only one controller engine per physical hardware controller. With such restrictions, additional hardware controllers are needed to be introduced to enable multiple controller engines. However, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). By executing multiple controller engine instances on the controller, each particular controller engine instance can handle at least a portion of a process and/or a device within the industrial automation environment. For instance, the controller can employ a controller engine instance to handle the first process, a controller engine instance to control the second process, and/or a controller engine instance to handle/control the device. It is to be appreciated that the controller can implement most any suitable number of controller engine instances. In another example, a first controller engine instance can be utilized for the first process and the second process while a disparate controller engine instance can be utilized for the device. In other words, the various number of controller engine instance can be managed to control, handle, and/or execute a device and/or process in most any suitable combination.

In another example, an industrial automation environment can include controller A, controller B, and controller C. In one scenario, each controller engine instance can execute on a corresponding controller. However, there can be distributed controller engine instances (e.g., a controller engine instance with more than one host and/or parent controller) such that more than one controller can handle and/or host a controller engine instance. By sharing and/or distributing the execution of the controller engine instance to more than one controller, the full potential of controllers and respective controller engine instances can be reached.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). It is to be appreciated that the system 200 can enable the creation of controller engine instances without user intervention. Thus, the creation and/or generation of the controller engine instances to execute on the real time operating system (OS) corresponding to the controller can be automatic and seamless.

Furthermore, the edit component 102 can facilitate manipulating code associated with a controller engine instance 202 executing on the controller 104. The edit component 102 can allow on-the-fly changing (e.g., swapping, exchanging, updating, installing, uninstalling, re-installing, etc.) of code such that the exchange can be isolated and/or targeted solely to the controller engine instance and/or particular selection of code that is to be changed. For instance, a controller can host a plurality of controller engine instances such that each controller engine instance can include respective portions of code with each portion of code having a particular version, state, and/or content. The edit component 102 can enable real-time exchanging/manipulating of a selected portion of code with a disparate portion of code and such exchange/manipulation can be isolated to the specific controller engine instance so as to not disturb other code, controllers, and/or controller engine instances. Moreover, it is to be appreciated that the code that can be provided online, offline, and/or most any suitable combination thereof.

Figure 3:
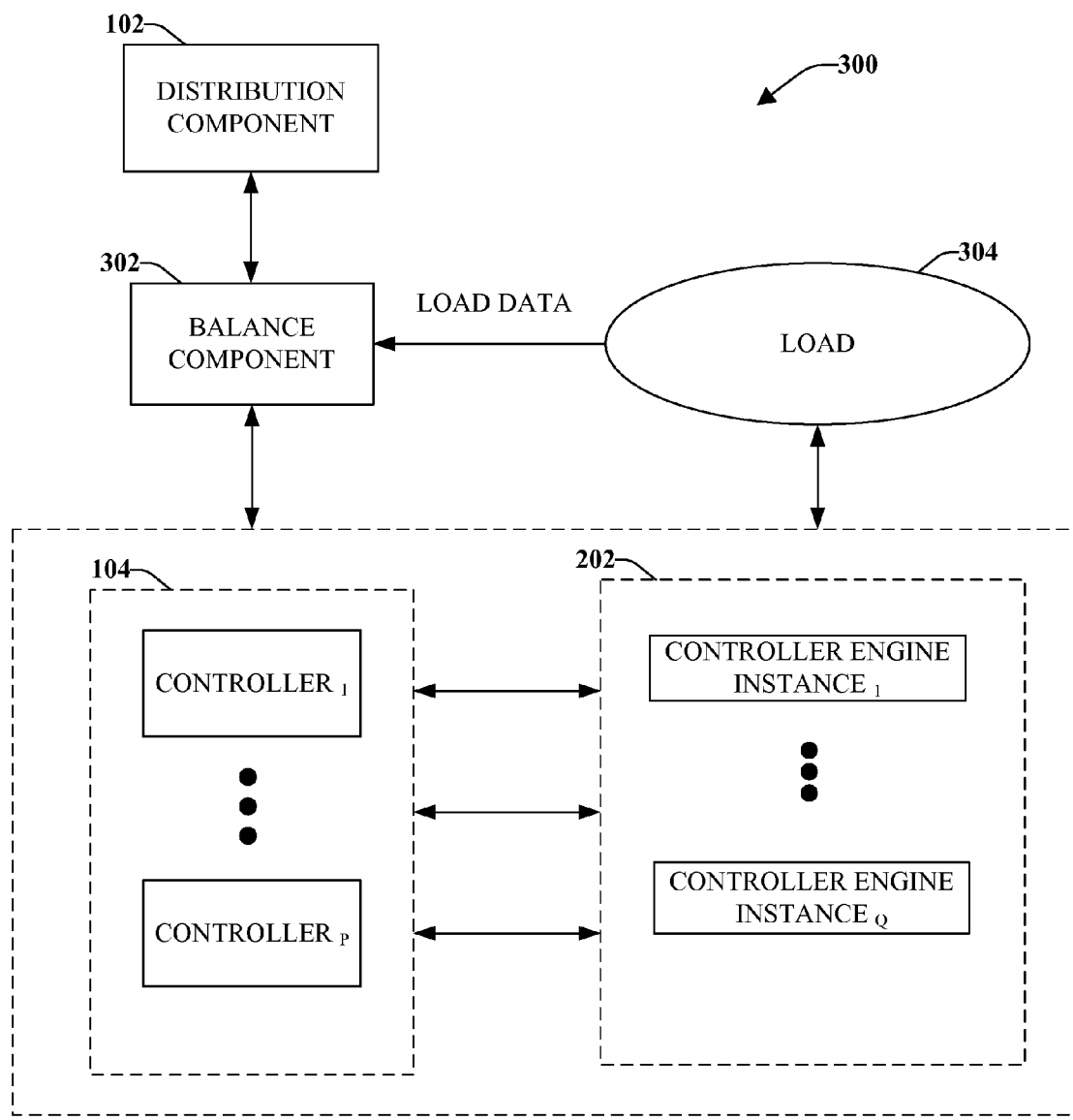
FIG. 3 illustrates a block diagram of an exemplary system that facilitates dynamically distributing a load amongst a plurality of controllers and/or a plurality of controller engine instances.

FIG. 3 illustrates a system 300 that facilitates dynamically distributing a load amongst a plurality of controllers and/or a plurality of controller engine instances. The system 300 can include a balance component 302 that can employ dynamic allocation of a portion of a load 304 to one or more controllers 104 and/or one or more controller engine instances 202 without user intervention. Generally, the balance component 302 can adjust a load assignment (e.g., load A is assigned to controller X, load B is assigned to controller Y, etc.) for controllers 104 within an industrial automation environment without user intervention. Moreover, the balance component 302 can allow the distribution of most any suitable portion of the load 304 to most any suitable portion of the controllers 104 or most any suitable portion of controller engine instances 202. The examples and illustrations below associated with dynamic load distribution is intended to include distribution to a controller as well as a controller engine instance and the claimed subject matter is to include most any suitable combination of employing a controller and/or a controller engine instance.

For example, the load 304 can be partitioned into five (5) parts with five (5) controllers handling/controlling each part. In another example, the load 304 can be divided into four (4) pieces where a controller A can handle/control 2 pieces, controller B can handle/control 1 piece, and controller C can handle/control 1 piece. Still further, the load 304 can be divided into three (3) pieces where a host controller can include most any suitable number of controller engine instances that can handle/control the three (3) pieces accordingly (e.g., evenly distributed, percentage-based, processor-based percentage, resource availability-based, etc.). It is to be appreciated that the load 304 can be partitioned and/or distributed based on most any suitable manner such as, but not limited to, percentage based, functionality, importance, priority, security, location, source/origin, user preference, user-defined manner, relation to source code, etc. Furthermore, it is to be appreciated that the balance component 302 can distribute a portion of the load 304 to most any suitable number of controllers 104 such as controller $_1$, controller $_2$ to controller $_P$, where P is a positive integer. Moreover, it is to be appreciated that the balance component 302 can distribute a portion of the load 304 to most any suitable number of controller engine instances 202 regardless of the host controller (e.g., remote, local, resources, processing capabilities, etc.). Although a single balance component 302 is depicted, it is to be appreciated and understood that most any suitable number of balance components can be employed such that the balance component 302 can be within each controller, a stand-alone component, and/or most any suitable combination thereof.

By evaluating at least one of the load 304 and/or the controllers 104, the balance component 302 can enable self-tuning and/or dynamic distribution which optimizes and enhances controllers within industrial automation environments. Controllers within industrial automation environments typically have various characteristics and/or capabilities in relation to computation and/or processing ability. By evaluating such characteristics and/or the load 304, the system 300 greatly improves traditional techniques and/or mechanisms associated with controllers. It is to be appreciated that the load 304 can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc. For instance, the balance component 302 can monitor and/or track most any suitable characteristic associated with the capability of the controllers 104 such as, but not limited to, processing ability, hard drive, processor speed, memory, networking capabilities, version, edition, hardware age, processor type, controller brand, controller functionality, controller make, controller model, available resources, capacity available, accessibility, frequency of use, processor consumption, memory consumption, controller embedded software (e.g., firmware), etc.

Furthermore, it is to be appreciated that communication between most any suitable controllers handling/controlling a portion of the load 304 can be employed. Thus, the controllers 104 can communicate to each other in relation to the distribution of the load 304 therewith. Moreover, it is to be understood that the communication can be among most any suitable controller associated with the system 300 and the communication need not be between controllers sharing the load 304. Thus, a system can include controller A, controller B, and controller C such that a load is shared by controller A and controller B (e.g., no load on controller C, a disparate load on controller C, etc.). Controller C can communicate to controller A and/or controller B to notify of available processing resources/capabilities to which a portion of the load can then be shared by controller C. Furthermore, it is to be appreciated that the balance component 302 can receive such communications and re-distribute the allocation of the load 304 accordingly in real-time.

Additionally, the edit component 102 can allow dynamic employment of a portion of code with a selected controller engine instance in an isolated manner so as not to affect a disparate controller engine instance, a portion of code executing therewith, and/or a controller. The edit component 102 further allows a portion of code related to at least one of a controller engine instance and/or a controller and a disparate portion of code to be swapped and/or exchanged in real time and on-the-fly regardless of self-adjustment and/or self-tuning initiated by the balance component 302. For example, if the balance component 302 evaluates a load and distributes such load across a controller and a number of controller engine instances associated therewith, the edit component 102 can allow the code respective to such controller engine instances to be updated, exchanged, swapped, manipulated, etc. regardless of such change in load distribution. Thus, the code related to a controller and/or a controller engine instance can be changed (e.g., updated, installed, re-installed, uninstalled, versioned, etc.) dynamically regardless of the balance component 302 distributing and/or re-distributing a portion of the load 304.

Figure 4:
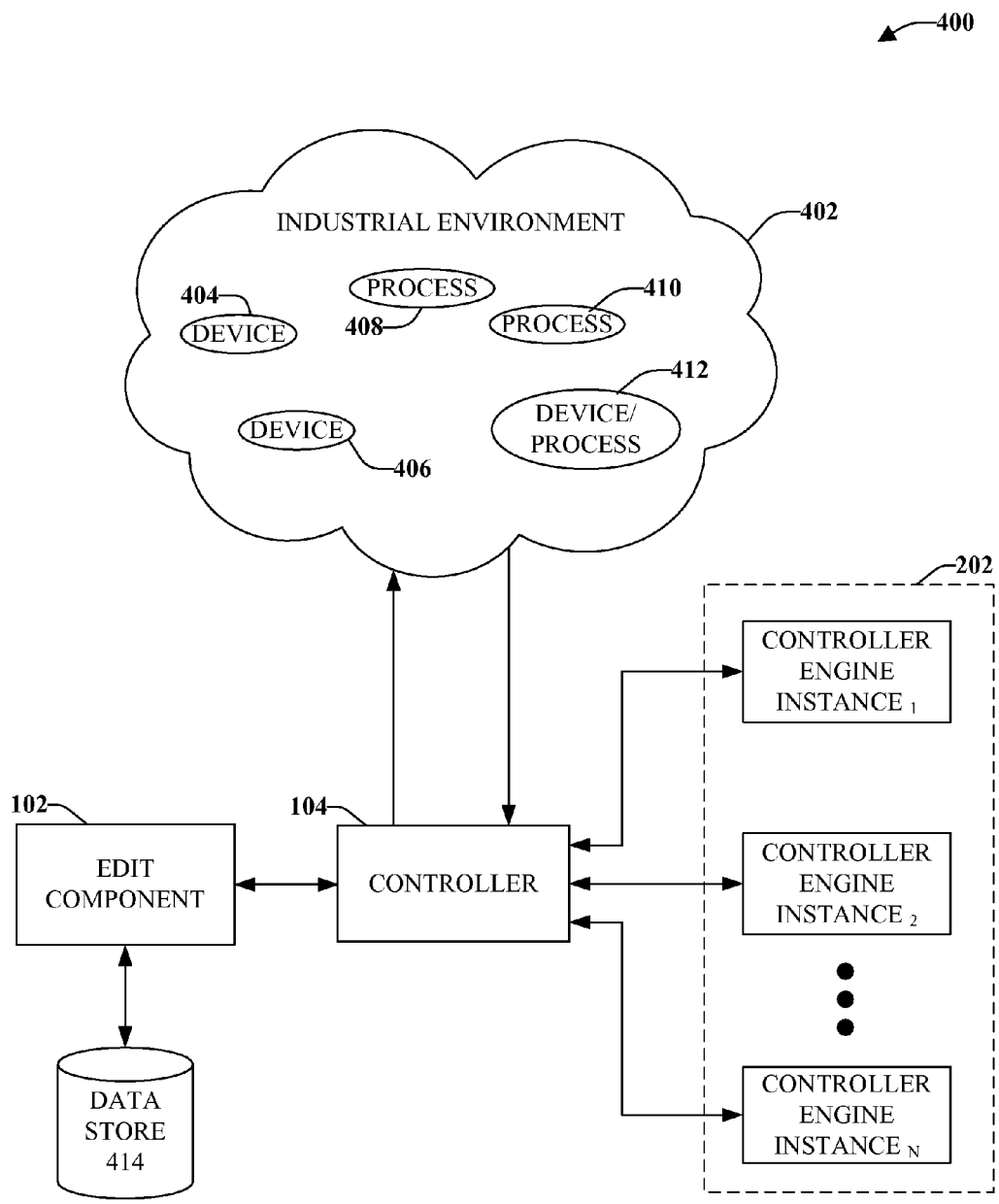
FIG. 4 illustrates a block diagram of an exemplary system that facilitates utilizing real-time editing techniques related to a portion of code associated with a controller engine instance.

FIG. 4 illustrates a system 400 that facilitates utilizing real-time editing techniques related to a portion of code associated with a controller engine instance. The edit component 102 can dynamically update a portion of data related to a controller engine instance 202 (hosted by the controller 104) on-the-fly while isolating such update from at least one of a controller and/or a controller engine instance within an industrial environment 402. For example, the industrial environment 402 can include most any suitable number of devices and/or process such as device 404, device 406, process 408, process 410, and/or device/process 412. It is to be appreciated that the devices and/or process within the industrial environment can be communicatively coupled to the system 400 by way of an intranet or other suitable network. The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, a robot, etc. Furthermore, the device and/or process can be controlled by the controller 104, a controller engine instance, a portion of a controller engine instance, and/or most any suitable combination thereof. It is to be appreciated that a controller can be executed as a component of a larger system can take part of the load sharing. For example, the controller can be executing as a component of the welder, wherein the controller may be capable of also interacting with the edit component 102.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers (discussed in more detail in FIG. 10). It is understood that this is but one example of a hierarchy, and is for illustrative purposes only.

Moreover, the system 400 can include a data store 414 that can store most any suitable data related to the edit component 102, the controller 104, a controller engine instance, and/or most any suitable combination thereof. For example, the data store 414 can store code, versions of code, installed versions of code, uninstalled versions of code, code locations, upgrades, patches, data related to previous code origins, code configurations and/or settings, code assignment in relation to controller engine instances, time periods associated with code version assignments, code performance data, historic data related to the industrial environment, historic data related to controller engine instance, controller data, most any suitable data related to a controller and/or a controller engine instance, health data related to a controller, transfer data, distribution data, etc. The data store 414 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), MRAM, a combination of NV memory with the access speeds of volatile memory, and Rambus dynamic RAM (RDRAM). The data store 414 of the subject systems and methods is intended to comprise, without being limited to, these and any other suitable types of memory. In addition, it is to be appreciated that the data store 414 can be a server, a database, a hard drive, and the like.

Figure 5:
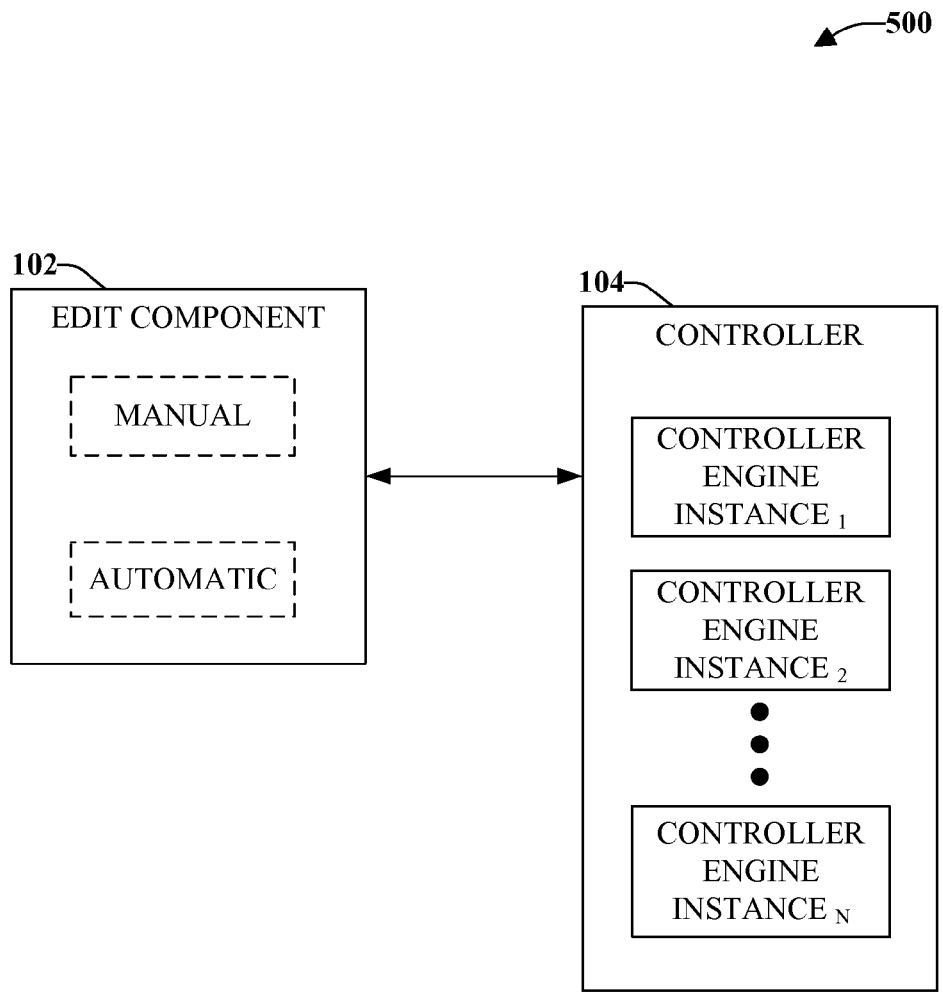
FIG. 5 illustrates a block diagram of an exemplary system that facilitates dynamically and seamlessly providing a portion of code to a controller engine instance.

FIG. 5 illustrates a system 500 that facilitates dynamically and seamlessly providing a portion of code to a controller engine instance. The system 500 can include the edit component 102 that can install a disparate portion of code to a controller engine instance in comparison to code already installed and/or existent on such controller engine instance. For example, a portion of code can be written offline, online, and/or most any suitable combination thereof, wherein such code can be targeted for a specific controller engine instance. The edit component 102 can provide on-the-fly exchanging of the portion of the code to the specific controller engine in isolation so as not to affect other controllers, controller engine instances, and/or portions of code. Such isolated swapping in real-time can optimize code trouble-shooting, error-checking, testing procedures, controller performance, controller engine performance, etc.

The edit component 102 can provide most any suitable technique for swapping, exchanging, manipulating, changing, installing, uninstalling, re-installing, etc. of a portion of code. It is to be appreciated that the edit component 102 can upload code from a controller engine instance. For example, the edit component 502 can include a manual technique and an automatic technique for implementing a portion of code with a controller engine instance. The manual technique can allow a user and/or entity (e.g., a machine, a portion of software, a computer, a company, an environment, a controller, etc.) to specify the details of such code implementation (e.g., timing for such code implementation, which controller engine instance to target, most any suitable details associated with the code implementation, etc.). The automatic technique can allow such code implementation to be employed automatically based on evaluating the controller 104 and/or the controller engine instance that is targeted for code implementation.

Figure 6:
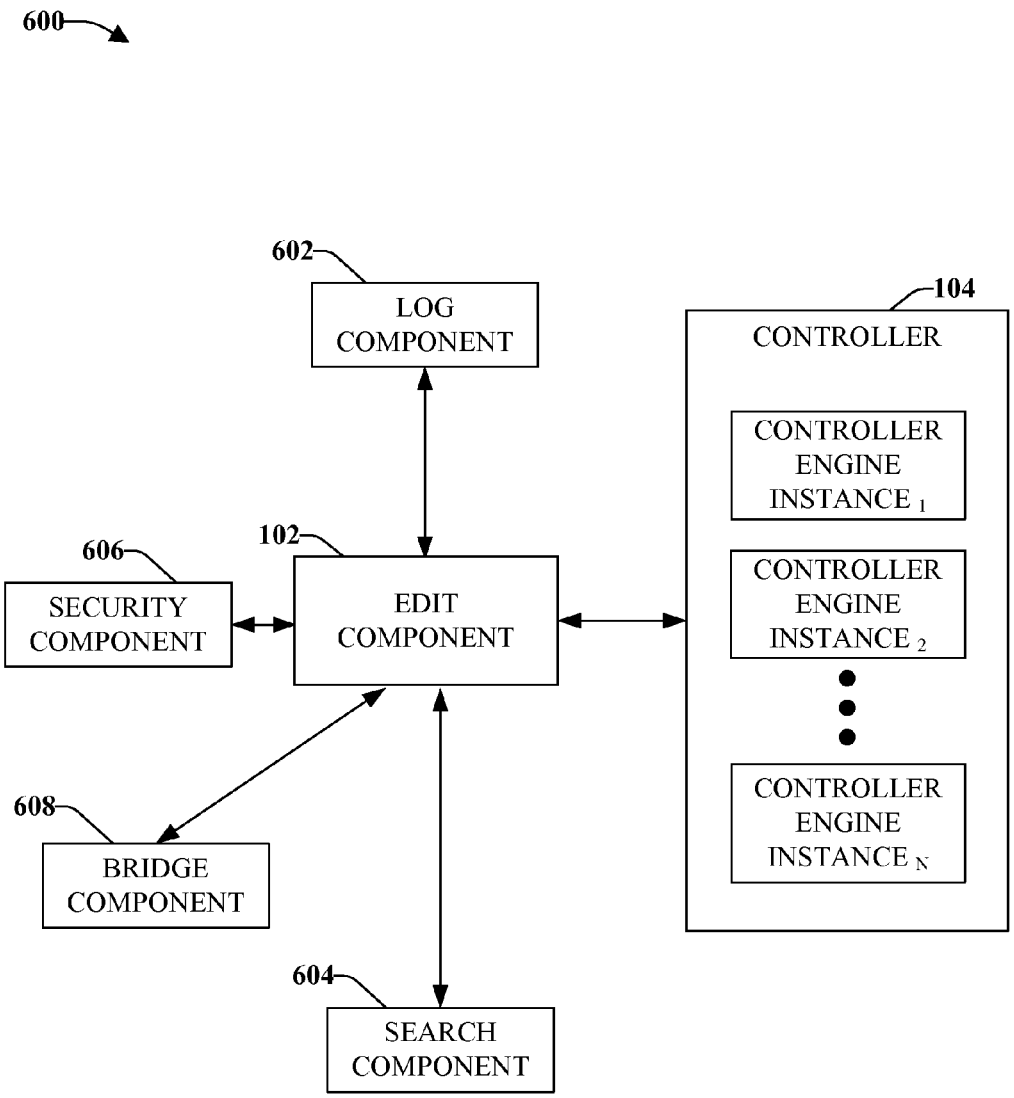
FIG. 6 illustrates a block diagram of an exemplary system that facilitates programming a controller engine instance in real-time within an industrial automation environment.

FIG. 6 illustrates a system 600 that facilitates programming a controller engine instance in real-time within an industrial automation environment. The system 600 can include the edit component 102 and the controller 104 that can utilize one or more controller engine instance, such that most any suitable number of controller engine instances 106 can be executed on the controller 104. The edit component 102 can enable offline and/or online dynamic data manipulation (e.g., programming, code update, data upgrade, code deletion, code addition, etc.) to at least a portion of a controller engine instance in an isolated manner. For example, the edit component 102 can implement a disparate portion of code (e.g., created online, created offline, and/or most any suitable combination thereof) to at least one controller engine instance without disruption and/or disturbance to other controllers, controller engine instances, etc. Thus, the edit component 102 can allow dynamic and on-the-fly code manipulation in an isolated manner in relation to the various versions of code associated with the controllers and/or controller engine instances.

The system 600 can utilize a log component 602 that tracks data in accordance with the claimed subject matter. In particular, the log component 602 can track and/or monitor data related to code versions, time stamps of code implementation, time stamps of install, time stamps of un-install, previous code utilized, code assignment for controllers, code assignment for a controller engine instance, user data for a code install, user data for a code uninstall, user data related to the system 600, assignment data, security data, hierarchy data, and/or most any suitable data related to the controller, controller engine instance, device, process, code, etc. It is to be appreciated that the log component 602 can be a stand-alone component, incorporated into the edit component 102, incorporated into the controller 104, incorporated into a controller engine instance, and/or any combination thereof.

For example, if a user installs a portion of data (e.g., code) to controller engine instance A, the log component 602 can track the user (e.g., via IP address, network address, user name, computer name, etc.), the date and time of install, details of the data/code, the location of where the code was installed, the controller hosting the controller engine instance, etc. The log component 602 can log various aspects related to programming, installing, uninstalling, etc. various portions of data related to a controller engine instance such as, but not limited to, a portion of code utilized by a controller and/or controller engine instance, configuration settings, security settings, time stamps, dates, user names and/or computer names, etc. Moreover, the log component 602 can store the logged entries in a data store (not shown).

The edit component 102 can further utilize a search component 604 that facilitates querying any data associated with the system 600. The search component 604 allows a user and/or any component to query the system 600 in relation to code, code installed, code uninstalled, controllers, controller assignment, controller engine instances, code assignment, controller engine instance data, controller data within the industrial environment, processes, devices, applications, portions of code, etc. For instance, a user can query the system 600 utilizing the search component 604 to find a portion of code on a specific controller engine instance associated with a particular controller within the Localville, Ohio plant. In another example, the search component 604 can allow a developer/user/entity (e.g., a computer, a machine, a corporation, a group, an individual, a controller, etc.) to provide all variable names associated with devices within sector 5, cell 6, and controlled by controller engine instance C executing on controller A. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the edit component 102, incorporated into the controller 104, incorporated into a controller engine instance, a stand-alone component, and/or any combination thereof.

The edit component 102 can further utilize a security component 606 that provides security to the system 600 to ensure data integrity and/or access in connection with the edit component 102, the controller 104, a controller engine instance, the plurality of controller engine instances, and/or most any suitable combination thereof. In particular, the security component 606 can define security, authorization, and/or privileges in accordance with at least one of a pre-defined hierarchy, security level, username, password, access rights, data importance (e.g., more important data correlates with high security clearance), etc. For instance, a particular portion of code can be a first security level with distinct security authorizations and/or privileges, while a disparate portion of code can have a second security level with disparate security authorizations and/or privileges. Thus, the security component 606 can provide granular security in relation to code, controllers, controller engine instances, devices, code/controller location, controller engine instance location, etc. It is to be appreciated that there can be various levels of security with numerous characteristics associated with each level and that the subject innovation is not limited to the above example. Moreover, the security component 606 provides granular security and/or privileges to the system 600. It is to be appreciated that security component 606 can be a stand-alone component, incorporated into the edit component 102, incorporated into the controller 104, incorporated into a controller engine instance, and/or any combination thereof.

The edit component 102 can further include a bridge component 608 that facilitates networking within an industrial automation environment. In other words, the bridge component 608 can act as a network bridge. It is to be appreciated that the bridge component 608 can be a stand-alone component, incorporated into the edit component 102, incorporated into the controller 104, incorporated into a controller engine instance, and/or any combination thereof. Thus, data carried by disparate networks can be manipulated so that it conforms to a common network. Accordingly, the bridge component 608 can recognize a network protocol associated with received instructions related to the edit component 102 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Figure 7:
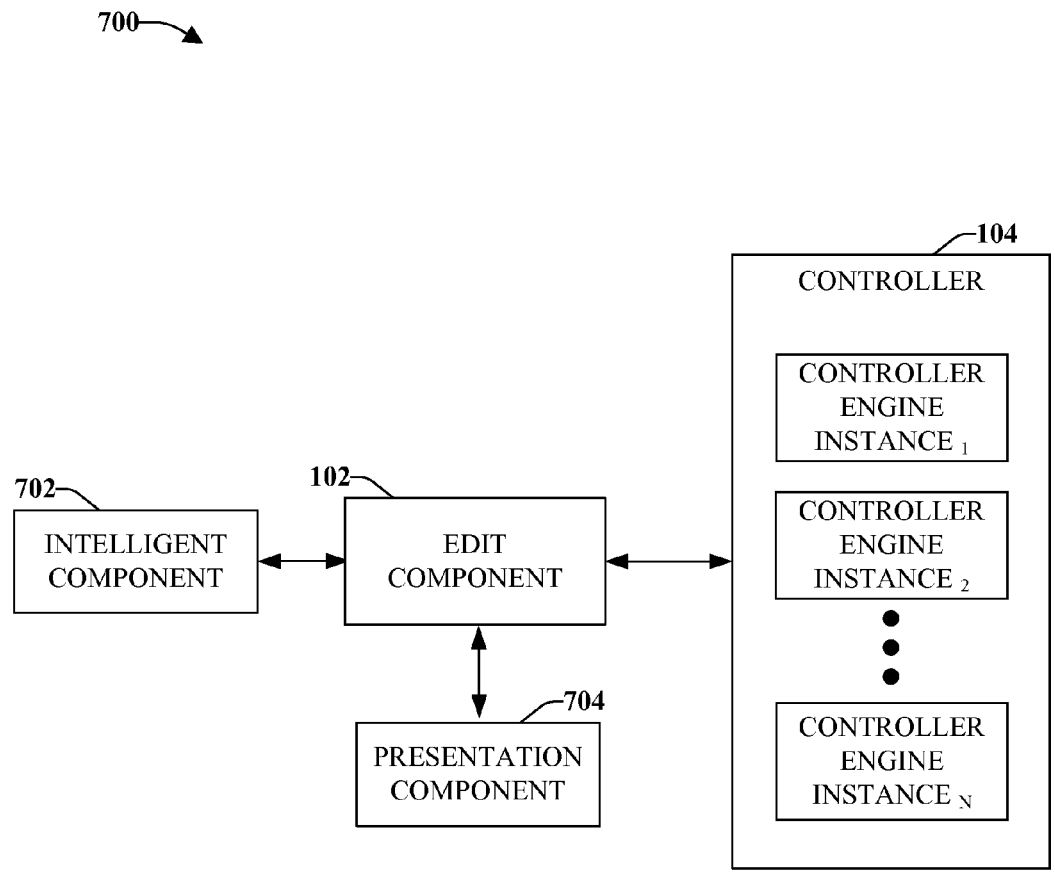
FIG. 7 illustrates a block diagram of an exemplary system that facilitates employing offline and/or online programming of at least one controller engine instance within an industrial environment.

FIG. 7 illustrates a system 700 that employs intelligence to facilitate employing offline and/or online programming of at least one controller engine instance within an industrial environment. The system 700 can include the controller 104 with two or more controller engine instances, and the edit component 104 that can all be substantially similar to respective controllers, instances, and components described in previous figures. The system 700 further includes an intelligent component 702. The intelligent component 702 can be utilized by the edit component 102 to facilitate programming at least one of an industrial automation environment, the controller 104, and/or a controller engine instance. For example, the intelligent component 702 can infer transfer periods and/or time frames for code to be uploaded, optimal code configurations, hand-off and controller engine assignments, installation and/or un-installation of code timing, errors, conflicts, trouble-shooting, solution to complications with code, evaluation of test code, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The presentation component 704 can provide various types of user interfaces to facilitate interaction between a user and any component coupled to at least one of the edit component 102, the controller 104, and/or a controller engine instance. As depicted, the presentation component 704 is a separate entity that can be utilized with edit component 102. However, it is to be appreciated that the presentation component 704 and/or similar view components can be incorporated into the edit component 102, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the edit component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. It is to be further appreciated that the presentation component 704 can utilize bio sensing, biometrics (e.g., fingerprints, retina scan, iris scan, facial patterns, hand measurement, etc.), and the like. Moreover, the presentation component 704 can present data to a non-human interfaces such as other machines.

Figure 8:
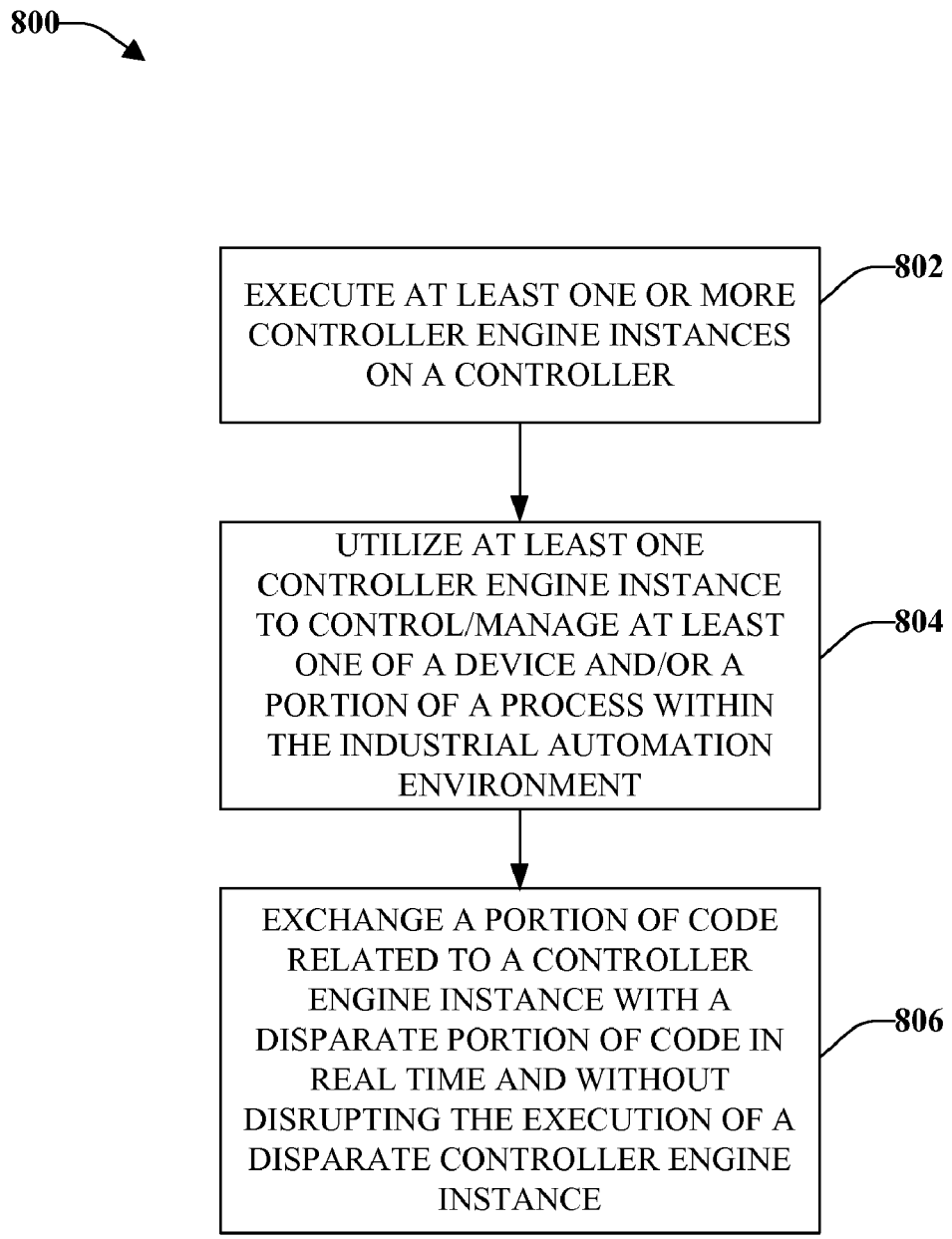
FIG. 8 illustrates an exemplary methodology for utilizing real-time editing techniques related to a portion of code associated with a controller engine instance.
Figure 9:
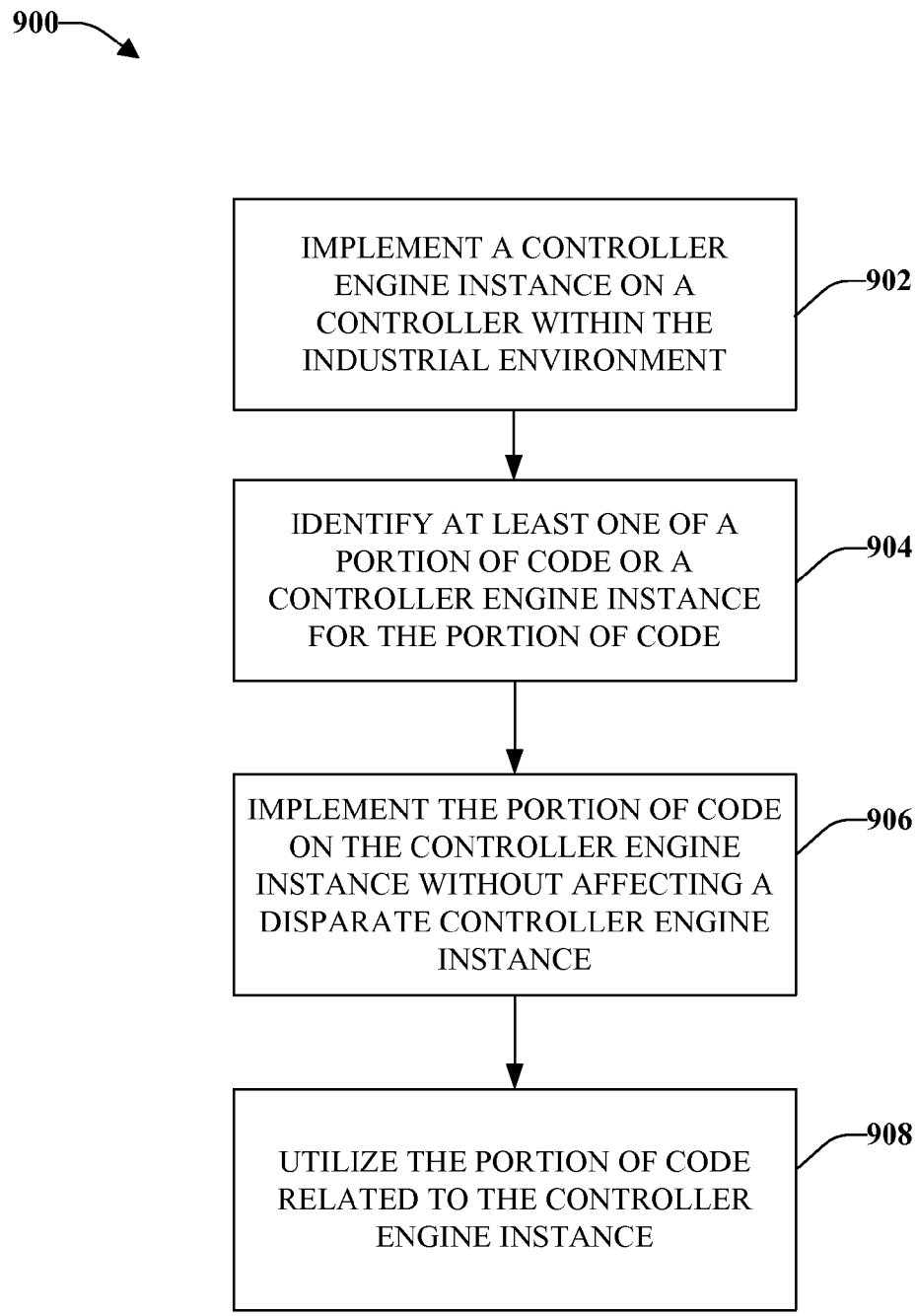
FIG. 9 illustrates an exemplary methodology that facilitates dynamically and seamlessly providing a portion of code to a controller engine instance.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for utilizing real-time editing techniques related to a portion of code associated with a controller engine instance. At reference numeral 802, at least one or more controller engine instances can be executed on a controller within an industrial automation environment. The controller can have a real time operating system (OS), wherein such controller can be employed in an industrial automation environment. It is to be appreciated that the controller can contain software components and hardware components having inputs and/or outputs that can be utilized in connection with automating an industrial manufacturing device/process within the industrial automation environment. Moreover, it is to be appreciated and understood that the controller can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control.

Furthermore, the controller can utilize most any suitable number of controller engine instances such as controller engine instance 1, controller engine instance $_2$, to controller engine instance N, where N is a positive integer. Furthermore, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). It is to be appreciated that the one or more controller engine instances can be executed without user intervention (e.g., in an automatic and seamless manner without human assistance). At reference numeral 804, at least one controller engine instance can be utilized to control and/or manage at least one of a device or a portion of a process within the industrial automation environment. It is to be appreciated that some controller engine instances may be a pure computational engine (e.g., control modules that compute gas flow, etc.) and may not control any devices. In other words, the controller can implement a plurality of controller engine instances, wherein each controller engine instance can handle controlling a device and/or portion of a process within an industrial automation environment.

At reference numeral 806, a portion of code related to a controller engine instance can be exchanged with a disparate portion of code in real time without disrupting and/or affecting execution of a disparate controller engine instance. In other words, a portion of code can be exchanged/updated/manipulated on-the-fly on a targeted controller engine instance while the controller engine instance is online, offline, and/or most any suitable combination thereof. Moreover, the portion of code that can be employed on the controller engine instance can be written offline, online, and/or most any suitable combination thereof. It is to be appreciated that dynamic change and/or exchange can include, but not limited to, code addition, code deletion, code content update, code functionality change, etc.

FIG. 9 illustrates a methodology 900 that facilitates dynamically and seamlessly providing a portion of code to a controller engine instance. At reference numeral 902, a controller engine instance can be implemented on a controller within an industrial environment. The industrial environment (e.g., an industrial environment, an automation environment, an environment, an automation industry, etc.) can employ a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy.

At reference numeral 904, at least one of a portion of code or a controller engine instance for the portion of code to be utilized (e.g., target controller engine instance) can be identified. For instance, the portion of code can be created manually, automatically, and/or most any suitable combination thereof. For instance, a portion of code can be created by a user while the controller engine instance is offline, online, and/or most any suitable combination thereof. The target controller engine instance can further be identified in an automatic and/or manual manner. At reference numeral 906, the portion of code can be implemented with the controller engine instance without affecting a disparate controller engine instance. Additionally, the code can be implemented without affecting a disparate controller and/or most any other suitable entity related to the industrial automation environment.

At reference numeral 908, a portion of software related to the controller engine instance can be utilized. For instance, the portion of software can be embedded on the controller, wherein the controller engine instance can dynamically execute such embedded software on the physical industrial control platform (e.g., the controller within the industrial environment). Moreover, it is to be appreciated that the controller can utilize most any suitable operating system such that the operating system is a proprietary operating system, off-the-shelf, a third-party operating system, an open source operating system, a real time operating system (OS), and/or most any suitable operating system related to a machine, computer, etc. Additionally, it is to be appreciated that there can be one or more operating systems related to a controller. Furthermore, one or more controller engine instances can run one or more operating systems.

Figure 10:
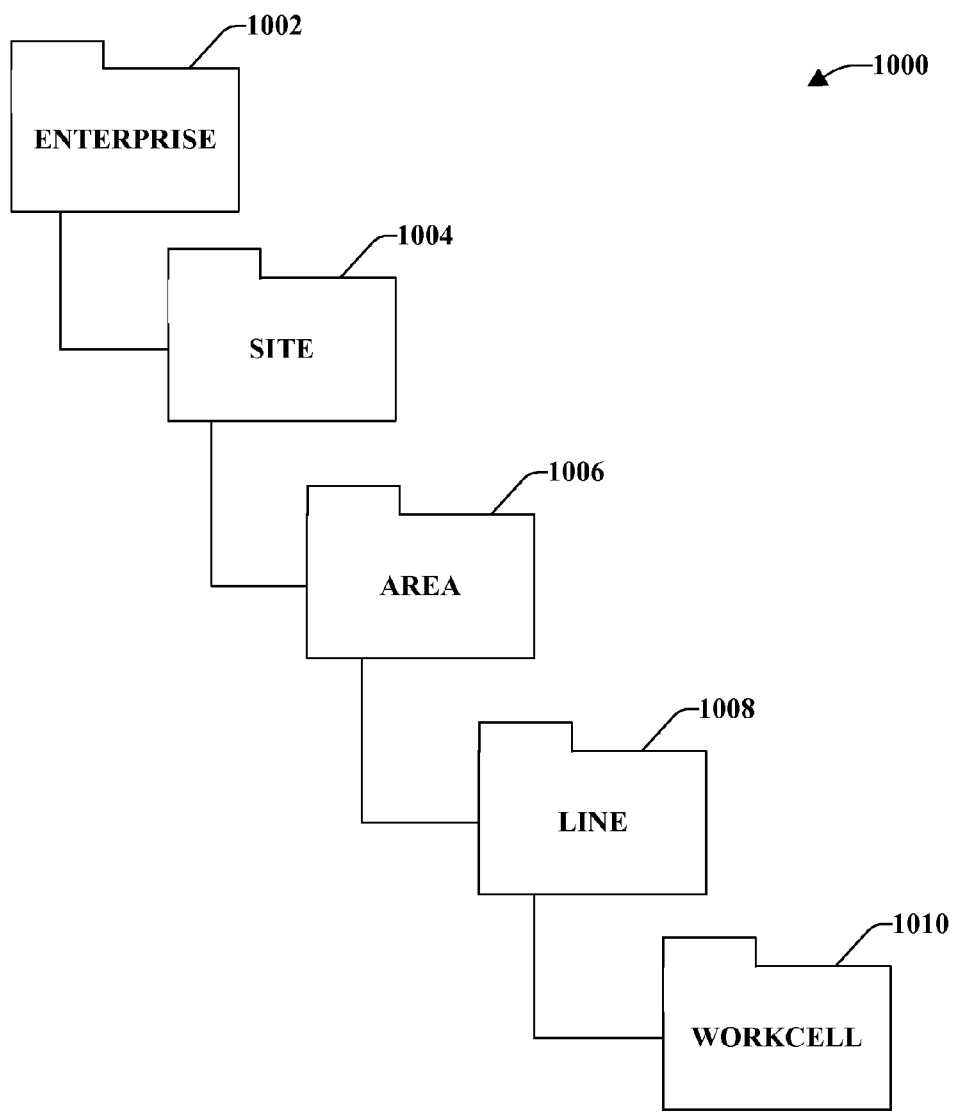
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of devices, processes, etc.) alluded to herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith. It is to be appreciated that the structure 1000 is for exemplary purposes only and a plurality of levels can be implemented with a multitude of entities can be employed.

Figure 11:
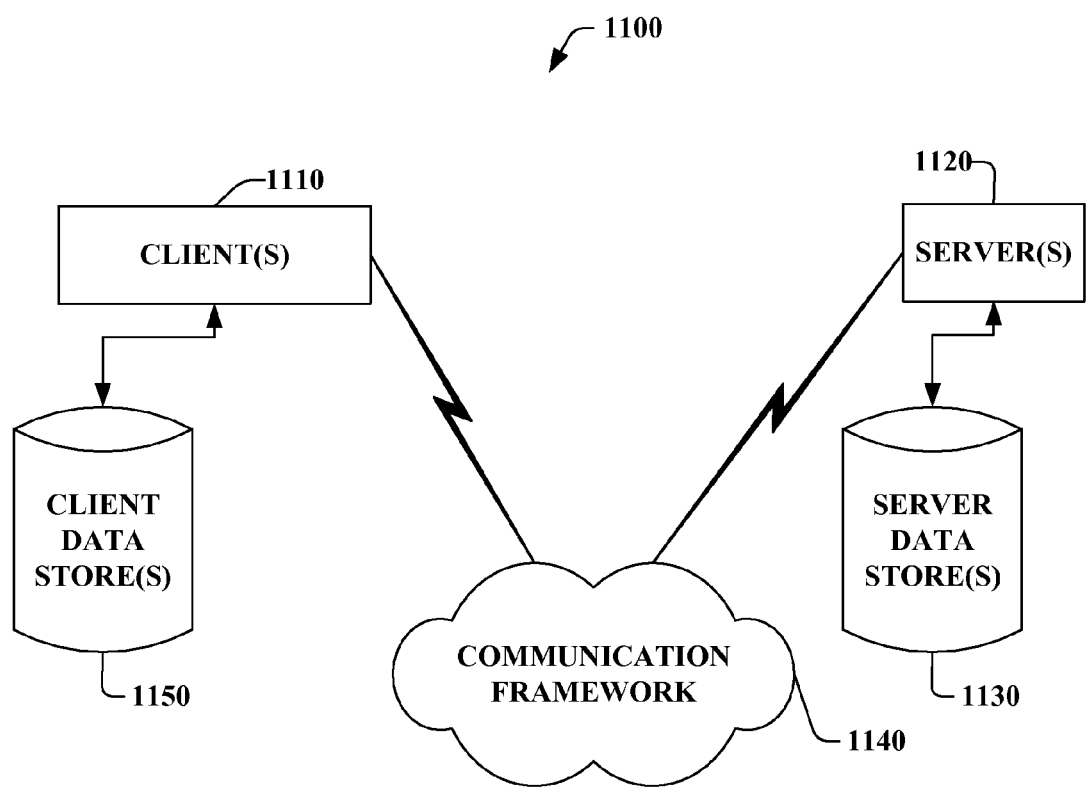
FIG. 11 is an exemplary computing environment that can be utilized in connection with the claimed subject matter.
Figure 12:
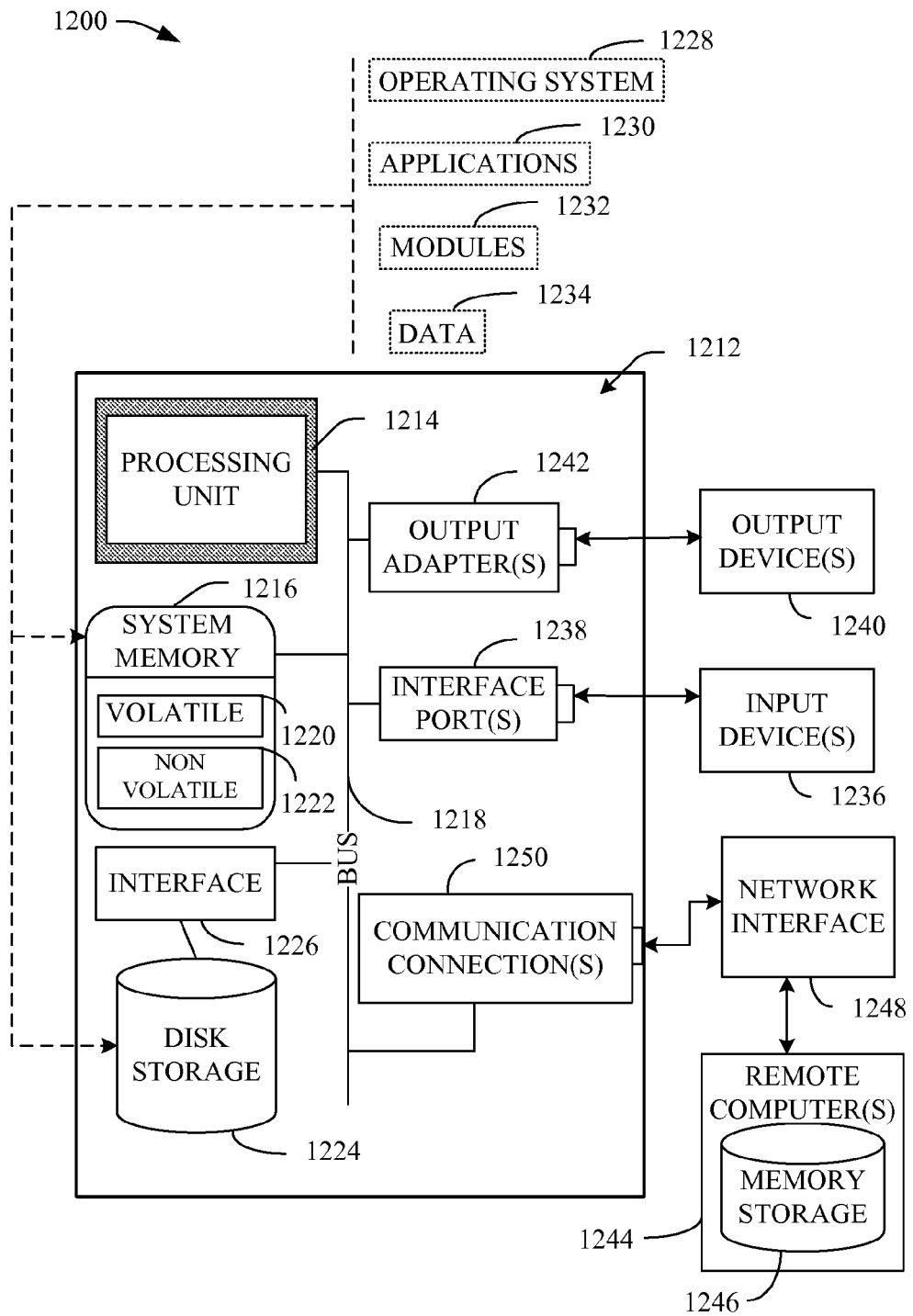
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchronous-link DRAM (SLDRAM), Rambus direct RAM (RDRAM), direct Rambus dynamic RAM (DRDRAM), MRAM, and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates programming in an industrial environment, comprising:
    an online controller that executes with a real-time operating system and includes two or more controller engine instances executing as processes on the online controller, where each controller engine instance controls a disparate process or device and employs a portion of code to control the process or device within the industrial environment; and
    an edit component that dynamically implements a portion of disparate code with at least one controller engine instance of the two or more controller engine instances executing as processes on the online controller, implementation of the portion of disparate code is based at least in part on evaluation of at least one of the online controller or the at least one controller engine instance.

2. The system of claim 1, the implementation of the portion of disparate code is at least one of an install, a re-install, an uninstall, an update, a swap, an exchange, a version update, an addition of code, a deletion of code, or a correction of code.

3. The system of claim 1, the portion of code is employed on a controller engine instance in the online controller without affecting a disparate controller engine instance in the online controller.

4. The system of claim 1, the portion of code is installed and uninstalled to a controller engine instance during a pre-determined period of time in order to trouble-shoot and minimize downtime within the industrial environment.

5. The system of claim 1, the edit component exchanges a first portion of code existent on the controller engine instance with a second portion of code in real time by isolating the controller engine instance.

6. The system of claim 1, further comprising a plurality of controller engine instances executing respective portions of code.

7. The system of claim 6, the edit component enables seamless and isolated manipulation of at least one portion of controller engine instance code.

8. The system of claim 1, the disparate portion of code is written to the controller engine instance at least one of online, offline or a portion of code written online and a portion of code written offline.

9. The system of claim 1, the edit component enables at least one of a manual exchange of the disparate portion of code or an automatic implementation of the portion of disparate code to a controller engine instance.

10. The system of claim 1, at least one of the device or a portion of the processes are hierarchically represented based at least in part upon a physical location of the device or process within the industrial environment.

11. The system of claim 10, the hierarchical representation of devices is based at least in part upon an industry standard which can be at least one of ISA, S95, or ISA S88.

12. The system of claim 11, the hierarchical representation is based at least in part upon the portion of disparate code implemented by the edit component.

13. The system of claim 1, further comprising a portion of software embedded on the online controller to enable dynamic execution by the two or more controller engine instances.

14. The system of claim 1, further comprising an operating system utilized by at least one of the online controller or the controller engine instance, the operating system is at least one of a third-party portion of software, an off-the-shelf operating system, a proprietary operating system, an open source operating system, or a combination thereof.

15. The system of claim 1, further comprising a security component that defines at least one of a security level, an authorization, or a privilege that corresponds to at least one of the portion of code or the disparate portion of code.

16. The system of claim 1, further comprising a search component that facilitates querying data associated with at least one of the online controller, the controller engine instance, the portion of code, the disparate portion of code, or data related to the industrial environment.

17. The system of claim 1, further comprising a log component that tracks data related to at least one of the online controller, the controller engine instance, the portion of code, the disparate portion of code, a code version, a time stamp of code implementation, a time stamp of install, a time stamp of un-install, a previous code utilized, a code assignment for a controller, a code assignment for a controller engine instance, user data related to the initiation of a code implementation, or user data related to the portion of code, or user data related to the disparate portion of code.

18. The system of claim 1, further comprising a bridge component that provides a first network protocol utilized to carry data from the edit component and configures the data for transmittal over a second network protocol.

19. The system of claim 18, the bridge component bridges multiple communication networks.

20. The system of claim 18, the first network protocol is one of Fieldbus, Profibus, Hart, Modbus, ASI-bus, or Foundation Fieldbus.

21. The system of claim 20, the second network protocol is Common Industrial Protocol (CIP).

22. A method that facilitates employing offline and/or online programming of at least one controller engine instance within an industrial environment, comprising:
  employing a controller with a real time operating system in an industrial environment;
  executing at least two or more controller engine instances retained in a memory on the controller, the two or more controller engine instances control disparate processes or devices within the industrial environment;
  utilizing with a processor at least two controller engine instances to manage the respective device or process being controlled by each controller engine instance; and
  exchanging a portion of code related to a controller engine instance with a disparate portion of code in real time without disrupting the execution of a disparate controller engine instance.

23. The method of claim 22, further comprising:
  identifying at least one of the portion of code or a controller engine instance for the portion of code to be implemented; and
  utilizing the portion of code related to the controller engine instance upon isolated deployment therewith.

24. The method of claim 22, the exchange of the portion of code is at least one of an install, a re-install, an uninstall, an update, a swap, an exchange, a version update, an addition of code, a deletion of code, or a correction of code.

25. A computer-implemented system that facilitates programming in an industrial environment, comprising:
  means for employing a controller within an industrial environment, the controller includes a real time operating system;
  means for executing two or more controller engine instances retained in a memory as processes on the controller, each controller engine instance controls a disparate process or device, and each controller engine instance employs a portion of code to control the process or device within the industrial environment;
  means for dynamically implementing a portion of disparate code with at least one controller engine instance in the two or more controller engine instances retained in the memory as processes on the controller, wherein implementation of the portion of disparate code is based at least in part on evaluation of the at least one controller engine instance.

* * * * *